(12) United States Patent
Pasternack (10) Patent No.: US 11,107,000 B2
(45) Date of Patent: Aug. 31, 2021

(54) SEQUENTIAL SAMPLING FROM MULTISETS

(71) Applicant: Microsoft Technology Licensing, LLC, Redmond, WA (US)

(72) Inventor: Jeffrey William Pasternack, Belmont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 842 days.

(21) Appl. No.: 15/908,375

(22) Filed: Feb. 28, 2018

(65) Prior Publication Data

US 2019/0197434 A1 Jun. 27, 2019

Related U.S. Application Data

(60) Provisional application No. 62/610,124, filed on Dec. 22, 2017.

(51) Int. Cl.
| | |
|---|---|
| *G06N 20/00* | (2019.01) |
| *G06Q 50/00* | (2012.01) |
| *G06F 17/18* | (2006.01) |
| *G06F 7/00* | (2006.01) |
| *G06F 40/40* | (2020.01) |
| *G06Q 30/02* | (2012.01) |

(52) U.S. Cl.
CPC .............. *G06N 20/00* (2019.01); *G06F 7/00* (2013.01); *G06F 17/18* (2013.01); *G06F 40/40* (2020.01); *G06Q 50/01* (2013.01); *G06Q 30/0251* (2013.01)

(58) Field of Classification Search
CPC .......... G06N 20/00; G06F 40/40; G06F 7/00; G06F 17/18; G06Q 50/01
USPC ........................................................... 706/12
See application file for complete search history.

(56) References Cited

U.S. PATENT DOCUMENTS

| | | | | |
|---|---|---|---|---|
| 6,604,090 | B1* | 8/2003 | Tackett | G06N 20/00 |
| | | | | 706/11 |
| 9,536,049 | B2* | 1/2017 | Brown | G06F 3/167 |
| 10,379,712 | B2* | 8/2019 | Brown | G06F 3/04842 |
| 2003/0212544 | A1* | 11/2003 | Acero | G06F 40/169 |
| | | | | 704/9 |
| 2014/0058983 | A1* | 2/2014 | Alexander | G06N 5/02 |
| | | | | 706/12 |
| 2018/0082212 | A1* | 3/2018 | Faivishevsky | G06N 20/00 |

* cited by examiner

*Primary Examiner* — William D Titcomb
(74) *Attorney, Agent, or Firm* — Hickman Becker Bingham Ledesma LLP (57) ABSTRACT

Systems, devices, media, and methods are presented for dynamically sampling training elements while training a plurality of machine learning models. The systems and methods access a plurality of training elements and generate an element buffer including a specified number of positions. The systems and methods generate a random value for each position for the element buffer and map a training element of the plurality of training elements to each position within the element buffer in a first order. The systems and methods generate a second order for the training elements and allocate the training elements to a plurality of machine learning models according to the second order.

20 Claims, 7 Drawing Sheets

SEQUENTIAL SAMPLING FROM MULTISETS

CROSS-REFERENCE TO RELATED APPLICATIONS

This application claims the benefit of U.S. Provisional Application No. 62/610,124, filed Dec. 22, 2017, entitled "SEQUENTIAL SAMPLING FROM MULTISETS," which is incorporated herein by reference in its entirety.

TECHNICAL FIELD

Embodiments of the present disclosure relate generally to the technical field of buffering and sampling datasets. In some example embodiments, the present disclosure describes systems and methods to sequentially sample a multiset for machine learned model generation.

BACKGROUND

Sampling data from large data sets has been implemented in computer model and behavior testing. Some sampling techniques include random shuffle sampling, naive sampling, and tree-based sampling. Random shuffle sampling linearizes a multiset into a list, places the list into a random order, and samples the list sequentially according to the random order (e.g., taking each element of the list in turn). Random shuffle sampling incurs a linear time cost in shuffling and an amortized time in distribution and a linear time to sample the elements. Further, the random shuffle process uses large portions of memory (e.g., order O(n), where n is the cardinality in the multiset) to store the random ordered list during the ordering and sampling process. Naive sampling selects a uniformly random integer, scans over the multiset in an arbitrary order, and finds a corresponding element to sample. Naive sampling loops through all of the elements, or a portion thereof, in the multiset and incurs a large time cost as a result. Tree-based sampling selects unique elements of the multiset as leaves on a tree structure. While the tree-based sampling has a different time cost than is associated with the random shuffle and naive sampling, the storage space used in tree-based sampling is larger.

BRIEF DESCRIPTION OF THE SEVERAL VIEWS OF THE DRAWINGS

Some embodiments are illustrated by way of example and not limitation in the accompanying drawings, in which.

DETAILED DESCRIPTION

Example methods and systems are shown for analyzing a social network to predict queries, rankings, and other actions on data sets within a networked system. In some embodiments, the methods and systems described herein enable analysis of a social network to predict member actions within the social networking system. In some example embodiments, a first member of a social network logs one or more changes to a data set (e.g., a member profile) in a social networking system. The one or more changes may correspond to a specified element or element type, such as a job or employment status. A network analysts machine sequentially samples a multiset for machine learned model generation.

Embodiments of the present disclosure describe methods and systems for multiset sampling or distribution sampling. Elements of the multisets or distributions may then be allocated. In some embodiments, after a multiset is sampled, the sampled portions (e.g., training elements or training examples) may be allocated among as set of receiving entities (e.g., members of a social networking system, users of a system, machine learning models, etc.). The embodiments of the present disclosure may also sample distributions of data. Given a multiset or a distribution for sampling, the presently disclosed methods and systems may find a sequence of samples drawn one after another. For example, given a multiset containing "k" unique elements, each with an associated count, or a discrete distribution with "k" unique values, each with an associated probability, the methods and systems may sample elements from the multiset without replacement or sampling from a distribution without replacement. The systems and methods may sample a multiset with replacement by treating the multiset as a distribution, with a probability for each element being a count of the element divided by a total number of elements in the multiset.

In some embodiments, the multiset sampling or distribution sampling may be used in cross-training, cross-validation, A/B testing, natural language processing, and other sampling or allocation processes. For example, in cross-training of machine learned models, the multiset sampling and distribution sampling may randomly assign examples to mutually exclusive sets for cross-training of distinct machine learned models. The multiset sampling and distribution sampling mechanisms of the present disclosure may assign equal numbers of training elements to each model being trained or validated. For example, given "c" sets within the multiset, embodiments of the present disclosure may train "c" machine learned models using all but one of the sets "s" of the multiset. Each set may correspond to a unique item in a multiset, such as an integer corresponding to that set. The integers are then sampled from the multiset in order to assign partitions/sets to the examples. The model may then be used for inference on "s". The results of the inferences may then be used for further evaluation or adding or modifying features of the model in later training. In some embodiments the training elements may be understood as training examples or discrete portions of the multiset.

In embodiments used in A/B testing, embodiments of the multiset sampling and distribution embodiments may be used to test new features or alternatives in a product, implementation, graphical user interface, distinct models, distinct ranking models or algorithms, or other suitable testing prospects. In A/B testing, multiset and distribution sampling embodiments may be used to assign users to different treatment groups. Each group may be presented with a variant of the testing prospects. Embodiments of the present disclosure or other suitable methods or systems may collect use, interaction, interest, elapsed time, or other suitable statistics and draw inferences for each presented treatment. For example, inferences may be drawn to identify which treatment affected behavior of users which are modified from a baseline and from other evaluated treatments. Sampling from the multiset without replacement may be used to ensure that a specified number of users are assigned to each group. For example, in experiments or testing with smaller numbers of users, sampling without replacement may preclude a risk of too few users, resulting in inadequate statistical power, or too many users, resulting in larger-than-expected adverse results. Each time a training element is sampled without replacement, a set or group from which that training element was selected may be decremented and a probability of selecting from that set or group may be subsequently reduced. Similarly, in allocation processes, multiset sampling and distribution sampling embodiments may allocate elements to users which are to be randomly allocated a set number of times. Such allocation allows provisioning data or elements to an exact number of users, exact set of demographics, or any other suitable grouping.

Multiset sampling, such as random shuffle, naive, and tree-based sampling often incurs time costs, storage costs, or both, which may prohibit useful implementation of such sampling mechanisms in certain operational environments. The previous methods for sampling from a multiset or distribution with "k" unique items, as outlined above, may use either $\omega$ (1) time per sample or $\omega$ (k) space. The present disclosure enables sampling from a multiset at a theoretically minimal cost in both time costs and storage space costs (e.g., sampled from a multiset at the minimum possible time and storage space costs). Some embodiments of the present disclosure enable multiset sampling at $\theta$ (1) time per sample, and $\theta$ (k) space. In such embodiments, $\theta$ (k) is a theoretically minimum space for storing an incompressible multiset or distribution itself. As such, the systems and methods contained herein are asymptotically optimal in both time and memory cost.

Social networking systems provide various profile options and services. In some instances, a social network may connect members (e.g., individuals associated with the social network) and organizations alike. Social networking services have also become a popular method of performing organizational research and job searching. Job listings representing openings (e.g., employment and volunteer positions) within an organization may be posted and administered by die organization or third parties (e.g., recruiters, employment agencies, etc.).

A social networking system may have a vast array of information pertaining to members of the social networking system, companies maintaining a social networking presence on the social networking system, and interactions between members, companies, and content provided by both the members and companies to the social networking system. As will be discussed in more detail below, information pertaining to members of the social networking system can include data items pertaining to education, work experience, skills, reputation, certifications, and other qualifications of each of the member's of the social networking system at particular points during the careers of these members, or interaction data indicating a history of interactions with content on the social networking system. This information pertaining to members of the social networking system may be member-generated to enable individualization of social networking profiles as well as to enable dynamic and organic expansion and discovery of fields of experience, education, skills, and other information relating to personal and professional experiences of members of the social networking system. Further, this information may be used within embodiments of multiset sampling and distribution sampling. For example, A/B testing, item allocation, and model training and evaluation may leverage such user or member information to train and evaluate multisets, models, or member behavior, as explained in more detail herein.

Other aspects of the present inventive subject matter will be readily apparent from the description of the figures that follow.

Figure 1:
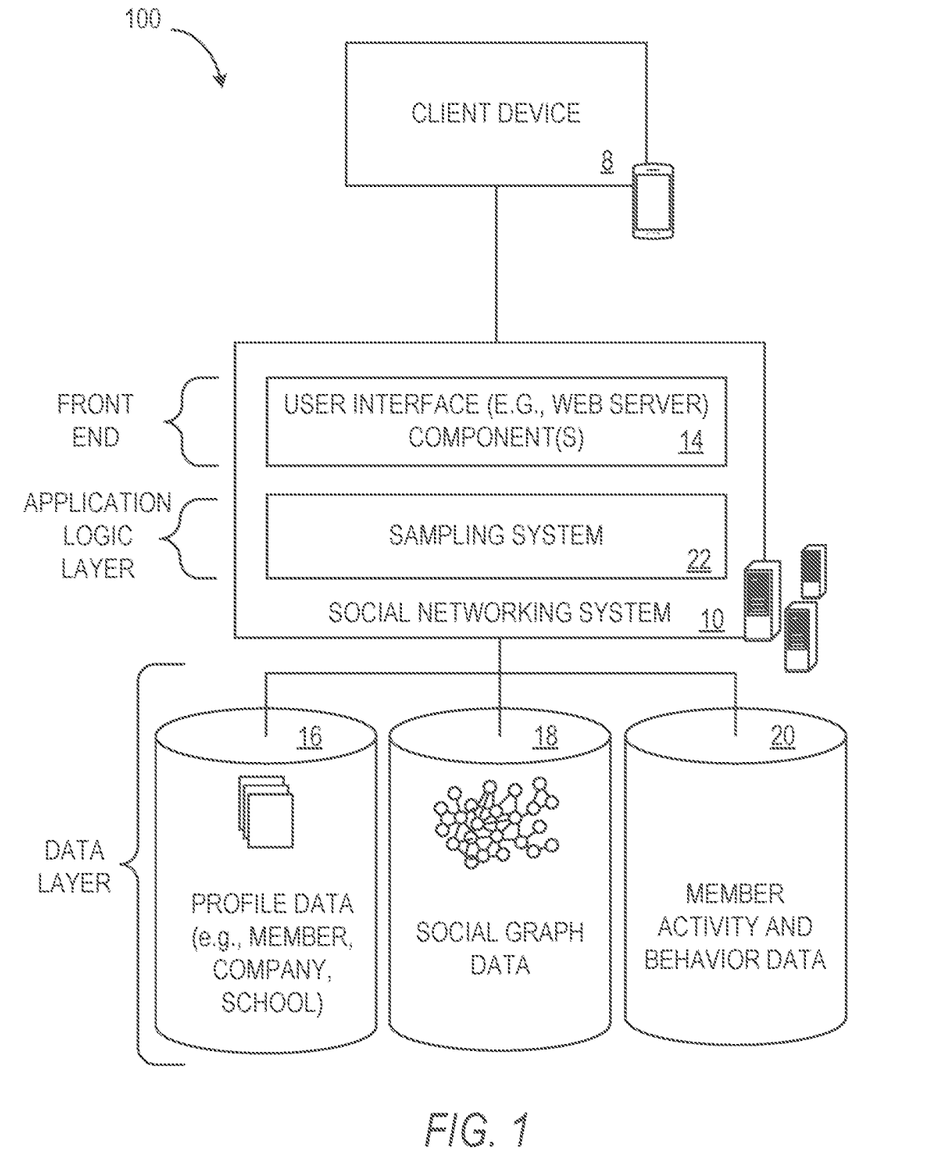
FIG. 1 is a block diagram of the functional components that comprise a computer- or network-based social networking system, including a sampling system, consistent with some embodiments described herein.

FIG. 1 is a block diagram 100 of the functional components that comprise a computer or network-based social networking system 10, consistent with some embodiments of the inventive concepts of the present disclosure. In some embodiments, the social networking system 10 acts as a network-based publication system. In these instances, as shown in FIG. 1, the social networking system 10 is generally based on a three-tiered architecture, comprising a front-end layer, application logic layer, and data layer. As is understood by skilled artisans in the relevant computer and Internet-related arts, each component or engine shown in FIG. 1 represents a set of executable software instructions (e.g., an instruction set executable by a processor or processor executable instructions) and the corresponding hardware (e.g., memory and processor) for executing the instructions. To avoid obscuring the inventive subject matter, various functional components and engines that are not germane to conveying an understanding of the inventive subject matter have been omitted from FIG. 1. However, a skilled artisan will readily recognize that various additional functional components and engines may be used with a social networking system 10, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although the social networking system 10 is depicted in FIG. 1 as having a three-tiered architecture, the inventive subject matter is by no means limited to such architecture.

As shown in FIG. 1, the front end comprises a user interface component 14 (e.g., a web server), which receives requests from various client devices 8, and communicates appropriate responses to the requesting client devices 8. For example, the user interface component 14 may receive requests in the form of Hypertext Transfer Protocol (HTTP) requests or other web-based application programming interface (API) requests. The client devices 8 may be executing conventional web browser applications or applications that have been developed for a specific platform to include any of a wide variety of mobile devices and operating systems.

As shown in FIG. 1, the data layer includes several databases, including one or more databases 16 for storing data relating to various entities represented in a social graph. In some embodiments, these entitles include members, companies, and/or educational institutions, among possible others. Consistent with some embodiments, when a person initially registers to become a member of the social networking service, and at various times subsequent to initially registering, the person will be prompted to provide some personal information, such as his or her name, age (e.g., birth date), gender, interests, contact information, home town, address, spouse's and/or family members' names, educational background (e.g., schools, majors, etc.), current job title, job description, industry, employment history, skills, professional organizations, and so on. This information is stored as part of a member's member profile, for example, in the database 16. In some embodiments, a member's profile data will include not only the explicitly provided data, but also any number of derived or computed member profile attributes and/or characteristics.

Once registered, a member may invite other members, or be invited by other members, to connect via the social networking service. A "connection" may mean a bilateral agreement by the members, such that both members acknowledge the establishment of the connection. Similarly, in some embodiments, a member may elect to "follow" another member. In contrast to establishing a "connection," the concept of "following" another member typically is a unilateral operation and, at least in some embodiments, does not include acknowledgement or approval by the member who is being followed. When one member follows another, the member who is following may receive automatic notifications about various activities undertaken by the member being followed. In addition to following another member, a member may elect to follow a company, a topic, a conversation, or some other entity, in general, the associations and relationships that a member has with other members and other-entities (e.g., companies, schools, etc.) become part of the social graph data maintained in a database 18. In some embodiments, a social graph data structure may be implemented with a graph database (e.g., the database 18), which is a particular type of database that uses graph structures with nodes, edges, and properties to represent and store data. In this case, the social graph data stored in the database 18 reflects the various entities that are part of the social graph, as well as how those entities are related with one another.

In various alternative embodiments, any number of other entities might be included in the social graph and, as such, various other databases may be used to store data corresponding with the other entities. For example, although not shown in FIG. 1, consistent with some embodiments, the social networking system 10 may include additional databases for storing information relating to a wide variety of entities, such as information concerning various online or offline groups, job listings or postings, photographs, audio or video files, and so forth.

In some embodiments, the social networking service may include one or more activity and/or event-tracking components, which generally detect various member-related activities and/or events, and then store information relating to those activities/events in a database 20. For example, the tracking components may identify when a member makes a change to some attribute of his or her member profile or adds a new attribute. Additionally, a tracking component may detect the interactions that a member has with different types of content. Such information may be used, for example, by one or more recommendation engines to tailor the content presented to a particular member, and generally to tailor the member experience for a particular member.

The application logic layer includes various application server components, which, in conjunction with the user interface component 14, generate various user interfaces (e.g., web pages) with data retrieved from various data sources in the data layer. In some embodiments, individual application server components are used to implement the functionality associated with various applications, services, and features of the social networking service. For instance, a messaging application, such as an email application, an instant messaging application, a social networking application native to a mobile device, a social networking application installed on a mobile device, or some hybrid or variation of these, may be implemented with one or more application server components implemented as a combination of hardware and software elements. Of course, other applications or services may be separately embodied in their own application server components.

As shown in FIG. 1, a sampling system 22 is an example application server component of the social networking system 10. The sampling system 22 performs operations to sequentially sample a multiset for machine learned model generation. In some embodiments, the sampling system 22 operates in conjunction with the user interface components 14 to receive sets of publication data, sets of member data, and member input to generate tailored user interface presentations including presenting machine learned analysis gleaned from sequentially sampling a multiset. For example, the sampling system 22 may render graphical representation of sampled multisets.

The social networking system 10 may provide a broad range of applications and services that allow members the opportunity to share and receive information, often customized to the interests of the member. For example, in some embodiments, the social networking system 10 may include a photo sharing application that allows members to upload and share photos with other member's, or a slide sharing application, which allows members to upload slide decks for sharing among other members. In some embodiments, member s of the social networking system 10 may be able to self-organize into groups, or interest groups, organized around a subject or topic of interest. Accordingly, the data for a group may be stored in a database (not shown). When a member joins a group, his or her membership in the group will be reflected in the social graph data stored in the database 18. In some embodiments, members may subscribe to or join groups affiliated with one or more companies. For instance, in some embodiments, members of the social networking system 10 may indicate an affiliation with a company at which they are employed, such that news and events pertaining to the company are automatically communicated to the members. In some embodiments, members may be allowed to subscribe to receive information concerning companies other than the company with which they are employed. Here again, membership in a group, a subscription or following relationship with a company or group, and an employment relationship with a company are all examples of the different types of relationships that may exist between different entities, as defined by the social graph and modeled with the social graph data of the database 18.

Figure 2:
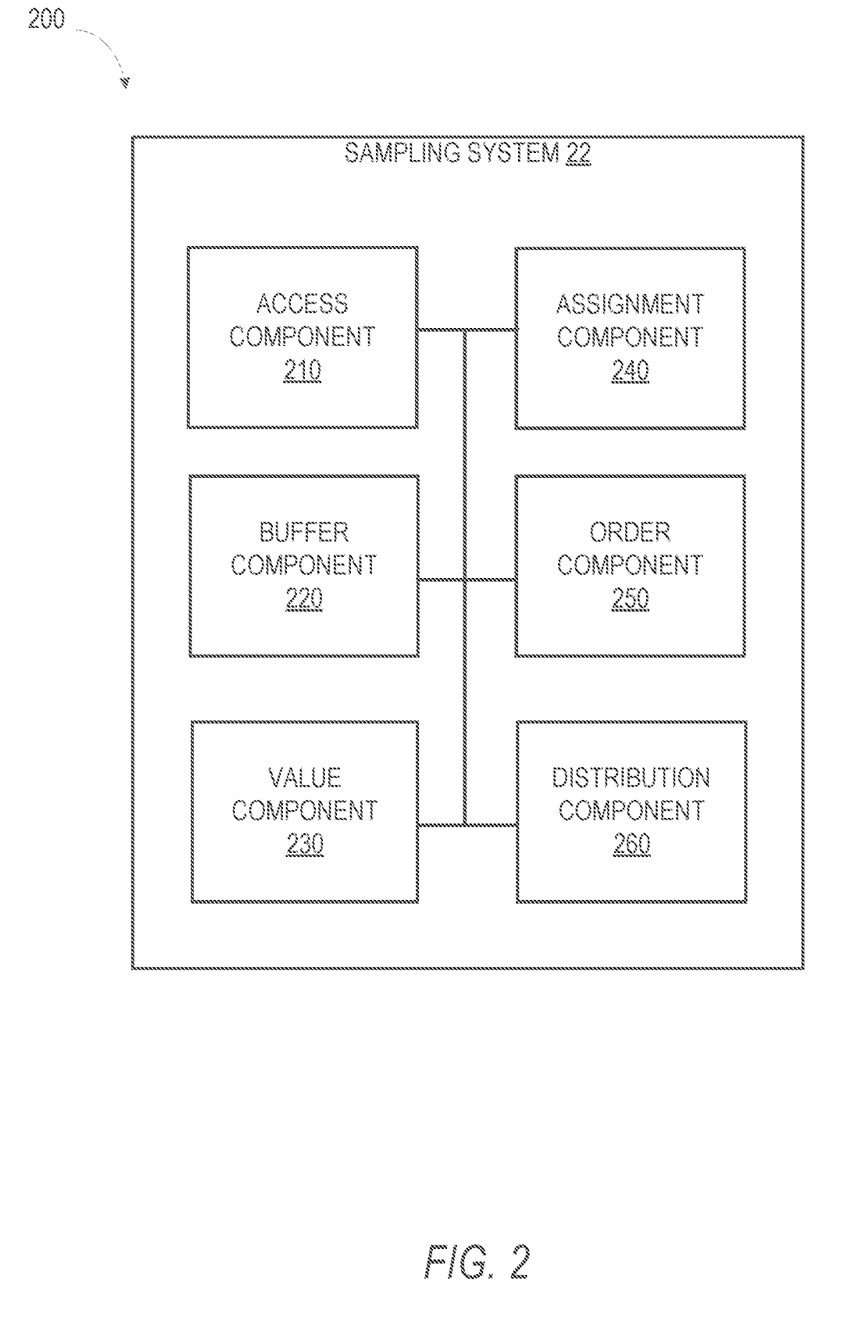
FIG. 2 is a block diagram depicting components of the sampling system of FIG. 1, in accordance with an example embodiment.

FIG. 2 is a block diagram 200 depicting some example components of the sampling system 22 of FIG. 1. The sampling system 22 is shown including an access component 210, a buffer component 220, a value component 230, an assignment component 240, an order component 250, and a distribution component 260, all configured to communicate with each other (e.g., via a bus, shared memory, a switch, or a network). Any one or more of the components described herein may be implemented using hardware (e.g., one or more processors specifically configured to perform the operations described herein) or a combination of hardware and software, forming a hardware-software implemented component. For example, any component described herein may configure a processor (e.g., among one or more processors of a machine) as a special-purpose machine, during the pendency of a set of operations, to perform the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
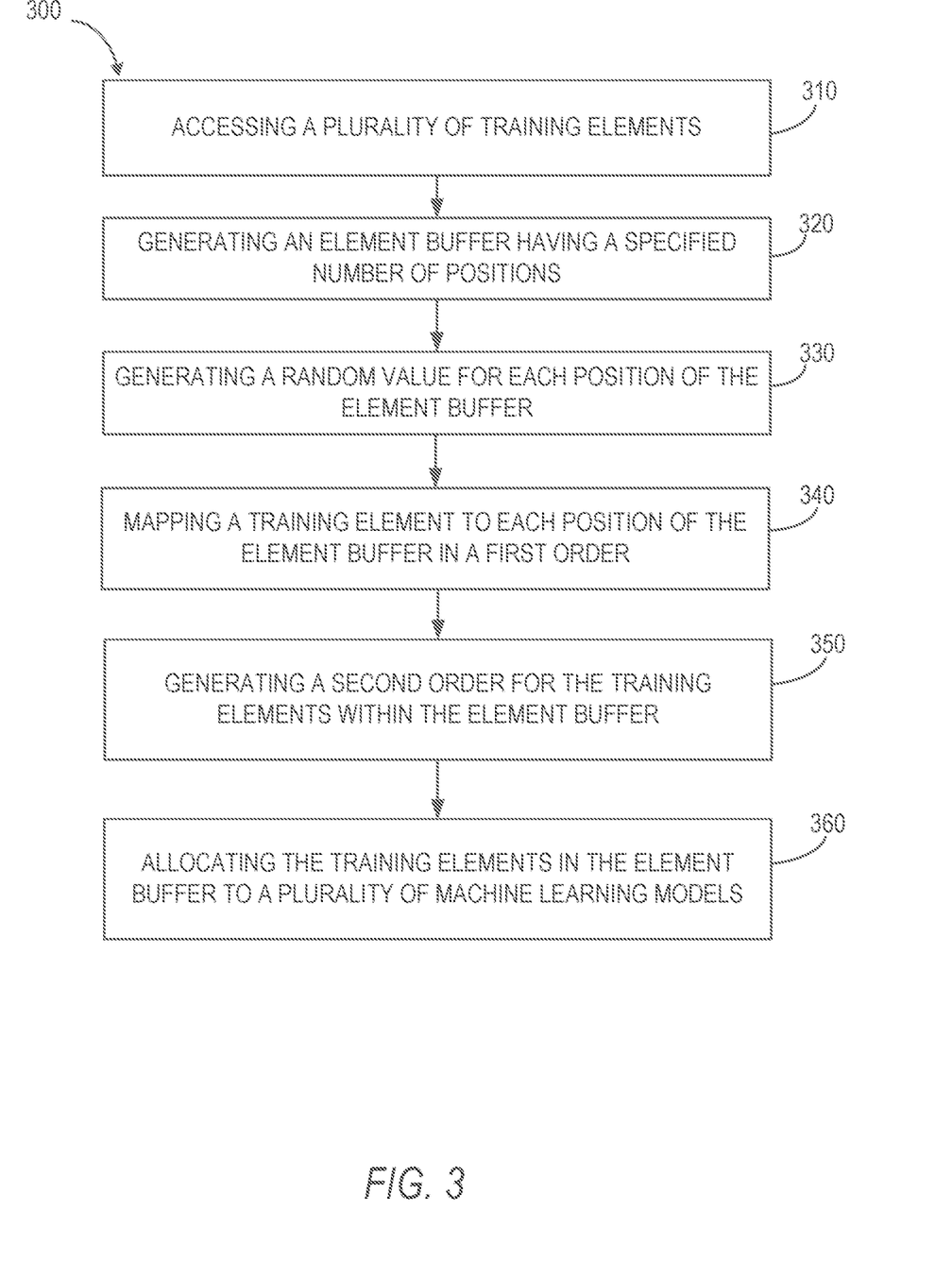
FIG. 3 is a flow diagram illustrating a method of sequentially sampling a multiset for machine learned model generation, according to some embodiments of the present disclosure.

FIG. 3 is a flow diagram illustrating an example method 300 of sequentially sampling a multiset for machine learned model generation, consistent with various embodiments described herein. For example, the method 300 may comprise generating a buffer tailored to a multiset and a set of machine learned models to provide the models with a randomized set of learning, testing, and evaluation input. The method 300 may be performed, at least in part, by, for example, the sampling system 22 illustrated in FIG. 2 (or an apparatus having similar components or operative programming, such as one or more client machines or application servers).

In operation 310, the access component 210 accesses a plurality of training elements. The plurality of training elements may be understood as a multiset or a distribution of data. Training elements may be training examples within the multiset or distribution. A multiset or distribution may include partitions, separating portions thereof. Each portion may include training elements or training examples of a specified type. Integers corresponding to the portions of the multiset or distribution may be selected, as described in more detail below. Training elements or training examples may be sampled based on the integers.

The plurality of training elements may include "k" unique elements with a total training element count of "n". The plurality of training elements may be accessed on a database accessible to the sampling system 22, such as the databases 16, 18, and 20 for profile data, social graph data, and member activity and behavior data, respectively. In some instances, the plurality of training elements may be accessed on a third-party database, remote from but accessible to the sampling system 22. In some embodiments, the access component 210 accesses the plurality of training elements within a training set on a training database. The plurality of training elements may be unique or distinct from one another. The training elements may be values, strings, words, graphical elements, or any other suitable data.

In some embodiments, the plurality of training elements is separated into two or more sets of training elements. The training elements may be separated into sets of training elements based on common categories, common types, time characteristics, common contents, or other suitable attributes. In some embodiments, the plurality of training elements is separated into sets of training elements randomly. A value range may be assigned to each set of training elements.

In operation 320, the buffer component 220 generates an element buffer. The element buffer may be configured to enable sequential retrieval and allocation of training elements until exhaustion. Exhaustion of the element buffer occurs when all of the training elements within the buffer at a given point in time have been retrieved or allocated. Upon exhaustion, the element buffer may be repopulated automatically, as described below, in some embodiments, the element buffer includes a specified number of positions. The element buffer may be of a fixed size. The element buffer may be configured to receive a sequence of elements in the specified number of positions. The plurality of training elements may include a number of elements greater than the number of specified positions contained within the element buffer. In embodiments where the plurality of training elements are separated into sets of training elements, the element buffer may also include a number of positions corresponding to a number of sets of the sets of training elements. The relationship of positions and plurality of training elements may be represented as θ (k), where "θ (k)" is a quantity that is k times a constant value, which does not vary with k. The size of the buffer may be a constant value, such as a number of unique elements or unique sets of training elements times k. For example, the element buffer may include a number of positions equal to a number of sets of the sets of training elements times a value "k." The value of k may be any suitable number. For example, k may equal an integer (e.g., four), a decimal, or any suitable number.

In operation 330, the value component 230 generates a random value for each position for the element buffer. In some embodiments, the random value is selected or generated from a set of values. For example, where the plurality of training elements are separated into two or more sets of training elements and each set of training elements is associated with a distinct value range, the random value may be selected or generated as a value falling into at least one of the value ranges associated with a set of training elements. The value component 230 may draw or generate sorted random integers as the random values for each position of the element buffer. For example, the value component 230 may draw K=θ (k) sorted uniform random integers from (0, n) in K time. In some instances, the random integers may be drawn according to the Bently and Saxe method. In some instances, the value component 230 discards duplicate random values (e.g., integers).

In operation 340, the assignment component 240 maps a training element of the plurality of training elements to each position within the element buffer. In some embodiments, the assignment component 240 maps the training elements based on the random value for each position. The assignment component 240 may map training elements to each position in the element buffer by stepping through positions within the element buffer, comparing the random value assigned to each position, and insert, assign, or otherwise map a training element to a position which has a value corresponding to the random value for that position. The training elements may be mapped to positions of the element buffer in a first order. In embodiments where the plurality of training elements are separated into two or more sets of training elements, each set of training elements associated with a value range, training elements may be mapped to each position within the element buffer based on the value range of the set of training elements and the random value assigned to each position. Mapping of the training elements to positions in the element buffer may be performed in a time represented by θ (max (k, K))=θ (k). As described in the present disclosure, such a representation of time may be understood as K=θ (k).

In some embodiments, a set of training elements may be decremented after mapping a training element from that set. In such embodiments, a first training element may be mapped from a first set of training elements to a first position of the element buffer. After the first training element is mapped, a second training element may be identified. The second training element may be a training element to be mapped to a second position of the element buffer. The second training element may be associated with a second set of training elements distinct from the first set of training elements. Upon identifying the second training element is associated with the second set of training elements and is to be mapped to the second training position, the distribution component 260 may decrement the first set of training elements. The first set of training elements may be decremented according to a number of training elements, from the first set of training elements, mapped to the element buffer. For example, where a single training element of the first set of training elements has been mapped before identification of a training element from the second set of training elements, the first set of training elements may be decremented by one. Where multiple training elements from the first set of training elements are mapped prior to identification of a training element from the second set of training elements, a value equal to the number of mapped training elements may be decremented from the first set of training elements.

In operation 350, the order component 250 generates a second order for the training elements. The second order may be generated by modifying positions of the training elements in the element buffer. In some embodiments, the second order is a random order or pseudorandom order. In such embodiments, the random order may be generated in any suitable manner or according to any suitable random number generating algorithm. Generating the second order may be performed in $\theta$ (K) time.

In operation 360, the distribution component 260 allocates the training elements in the element buffer to a plurality of machine learning models according to the second order. In some embodiments, the procedure to sample a sequence of training elements within the element buffer may be performed in $\theta$ (k) time, amortized $\theta$ (1) per sample, and $\theta$ (k) storage space. In some embodiments, the distribution component 260 allocates the training elements in the element buffer in sequence, according to the second order. As described in more detail below, in embodiments where the multiset is sampled with replacement, once the element buffer is empty, at least a portion of the method 300 may be repeated, to refill the element buffer. In embodiments where the multiset is sampled without replacement, the sampling may be treated as a discrete distribution and include with each training element a probability of selecting the corresponding item.

In some embodiments, the distribution component 260 may continue allocating the training elements of the plurality of training elements to the plurality of machine learning models until a stop condition is reached. In some embodiments, the stop condition may be associated with a training element threshold. In such embodiments, the distribution component 260 may identify a training element threshold for the plurality of machine learning models. The distribution component 260 may track a number of training elements allocated to each machine learning model of the plurality of machine learning models. Tracking of training elements may be performed by incrementing a count or value, accessible to the distribution component 260, for each machine learning model, when a training element is allocated to a given machine learning model. The distribution component 260 terminates allocation of training elements to the machine learning model based on a number of allocated training elements exceeding the training element threshold. The distribution component 260 may terminate allocation by denying, skipping, or otherwise ignoring an allocation request or an allocation order to allocate a training element to the machine learning model exceeding the training element threshold.

Although described with respect to machine learning models, the distribution component 260 may allocate training elements in a number of implementations. For example, in context of a natural language processing operation, training elements may comprise a plurality of title strings in varying languages. Given 1,000 training elements, the method 300 may split the plurality of training elements into a set of training elements (e.g., 800 training elements) and a set of test or evaluation elements (e.g., 200 test elements). Models may be trained using the set of training elements or a subset of the training elements. The trained models may be tested or evaluated using the set of testing elements. Cross validation may be performed by training each model on varying subsets of the 1,000 training elements (e.g., 10-100 training elements allocated across the 1,000 training elements). Training elements not used for training a specified model may then be used for testing or evaluation of the model. Once the models have been trained for natural language processing, the models may be averaged together to provide final testing metrics. Cross training of machine learned models may similarly be performed using logistic regression, grading boost decision trees, or any other suitable methods. Such cross training may enable generation of models capable of performing predictive natural language processing.

A/B testing may be performed by the distribution component 260 allocating variants to users and using one or more of the access component 210 and the distribution component 260 to monitor viewing, selecting, or other interactions with variants allocated to each user or member.

In some embodiments, the method 300 may be understood as an algorithm in which K=$\theta$ (k) sorted uniform random integers (0, n) are drawn. The integers can be drawn K times. Duplicate integers may be discarded. For example, where n>>K, a trivial number of duplicates may occur. The k unique elements of the multiset may be walked through, stored as an array of size k. Each value of the array may contain the number of copies of the corresponding element in the multiset. The random integers may be swapped with corresponding element identifications. Element counts may then be decremented in the process. The resulting list may be randomly shuffled and returned as a sequence of samples for allocation. Such embodiments may be understood as sampling from a multiset without replacement.

In some embodiments, the method 300 may be understood as an algorithm in which K=$\theta$ (k) sorted uniform random real numbers (0, 1) may be drawn. The k elements of a discrete distribution may be walked through. The k elements may be stored as an array of size k, with each element containing the probability of the corresponding item. The random reals may be swapped with their corresponding items. The resulting list may be randomly shuffled and returned as a sequence of samples for allocation. Such embodiments may be understood as sampling from a distribution with replacement.

In some instances, the method 300 and the methods described below may be represented in pseudocode. For example, an embodiment of the methods herein relating to multiset sampling without replacement may be represented as pseudocode below:

```
Precondition: M is a multiset of k unique elements m_0...m_{k-1} expressed as
  an array A
Precondition: buffer is an initially empty list of capacity K = ⌈c · k⌉, with
  constant c > 0
  function SAMPLE(A, buffer)
    if buffer is empty then
      FILLBUFER(A, buffer)
    end if
    return POP(buffer)          ▷ Remove and return last element
  end function
  function FILLBUFFER(A, buffer)
    if |A| ≤ CAPACITY(buffer) then
      LINEARIZE(A, buffer)
      A ← ∅                     ▷ ∀_i A_i = 0
    else
      randMax ← 1               ▷ Bounds the next sorted draw
      lastDraw ← null           ▷ Last drawn [0, |A| − 1] integer
      curItemIndex ← 0          ▷ [0, k − 1] index of unique item ∈ A
      countSoFar ← A[0]
      for i ← CAPACITY(buffer) to 1 step −1 do
        r ← u ∈ u(0, 1]
        randMax ← randMax · r^{1/i}   ▷ note that randMax > 0
        draw ← ⌊(1 − randMax) * |A|⌋
        if draw ≠ lastDraw then       ▷ Discard repeated draws
          lastDraw ← draw
          while draw ≥ countSoFar do
            countSoFar ← countSoFar + m[curItemIndex]
            curItemIndex ← curItemIndex + 1
          end while
          APPEND(buffer, curItemIndex)
          A[curItemIndex] ← A[curItemIndex] − 1
        end if
      end for
    end if
    FISHERYATESSHUFFLE(buffer)
  end function
```

In some instances, the method 300 and the methods described below may be represented in pseudocode. For example, an embodiment of the methods herein relating to discrete distribution sampling with replacement may be represented as pseudocode below:

```
Precondition: M is a discrete distribution of k event probabilities p_0...p_{k-1}
  expressed as an array A such that A[i] = P(pi).
Precondition: buffer is an initially empty list of capacity K = ⌈c·k⌉, with
  constant c > 0
  function SAMPLE(A, buffer)
    if buffer is empty then
      FILLBUFER(A, buffer)
    end if
    return POP(buffer)          ▷ Remove and return last element
  end function
  function FILLBUFFER(A, buffer)
    randMax ← 1                 ▷ Bounds the next sorted draw
    curEventIndex ← 0           ▷ [0, k −1] index of event ∈ A
    cumulativeProb ← A[0]
    for i ← CAPACITY(buffer) to 1 step −1 do
      r ← u ∈ u(0, 1]
      randMax ← randMax · r^{1/i}   ▷ Note that randMax > 0
      draw ← 1 − randMax
      while draw ≥ cumulativeprob do
        cumulativeProb ← cumulativeProb + m[curEventIndex]
        curEventIndex ← curEventIndex + 1
      end while
      APPEND(buffer, curEventIndex)
    end for
    FISHERYATESSHUFFLE(buffer)
  end function
```

Figure 4:
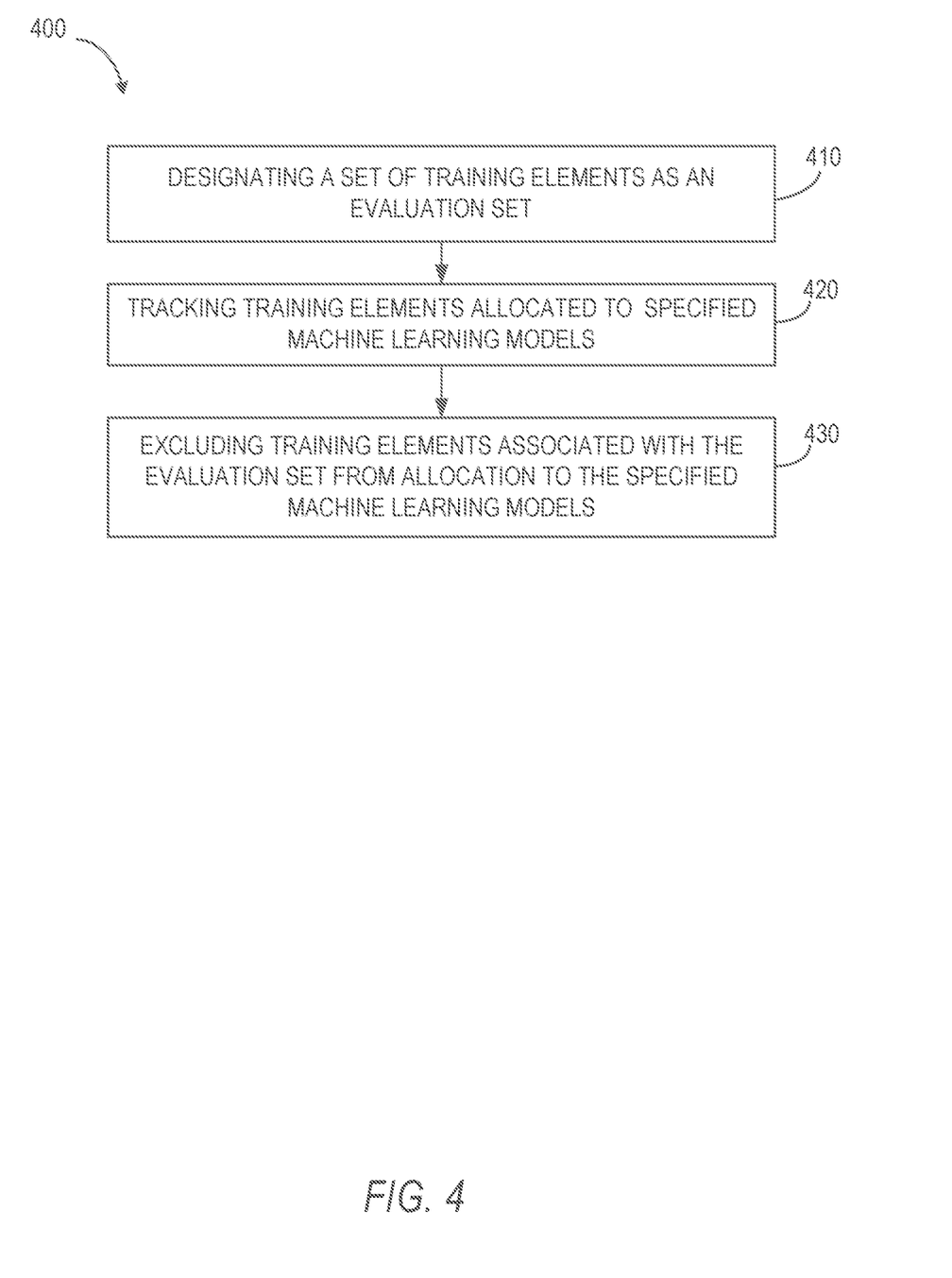
FIG. 4 is a flow diagram illustrating a method of sequentially sampling a multiset for machine learned model generation, according to some embodiments of the present disclosure.

FIG. 4 is a flow diagram illustrating a method 400 of sequentially sampling a multiset for machine learned model generation, consistent with various embodiments described herein. The method 400 may be performed, at least in part, by, for example, the sampling system 22 illustrated in FIG. 2 (or an apparatus having similar components, such as one or more client devices 8 or application servers). In some embodiments, the method 400 includes one or more operations from the method 300. In some instances, the method 400 is performed as a sub-operation or other part of operations 330 and 360.

In operation 410, the assignment component 240 designates a set of training elements as an evaluation set. In some embodiments, the plurality of training elements are separated into two or more sets of training elements. In such embodiments, the assignment component 240 selects and designates the evaluation set as one of the two or more sets of training elements. The evaluation set may be designated for a specified machine learning model. Representations of the designations may be stored along with each training element, in a metadata file, or any suitable manner.

In operation 420, the distribution component 260 tracks training elements allocated to the specified machine learning model. The distribution component 260 may track allocation of training elements by logging the training elements or representations thereof into each machine learned model, metadata (e.g., the metadata file containing the training element's designation) associated with each machine learned model or each training element. In some instances, the distribution component 260 maintains a table indicating or representing associations between allocated training elements and machine learned models. Once allocated to a model, a representation of a specified training element may be stored in a metadata file indicating an association formed between the specified training element and the model to which the specified training element is allocated. Further, the distribution component 260 may track types or designations associated with the training elements allocated to each machine learning model.

In operation 430, the distribution component 260 excludes training elements associated with the evaluation set from allocation to the specified machine learning model. The distribution component 260 may exclude allocation of elements from the evaluation set by identifying the designation of the element to be allocated prior to allocation of the element. Where the designation of an element, corresponding to a random value for a position within the element buffer, is an evaluation designation, the distribution component 260 or the value component 230 may discard the value or prevent retrieval of the evaluation element. The value component 230 may then reselect or generate a new value for the position to retrieve a subsequent training element. The distribution component 260 and the value component 230 may perform these operations until a training element is successfully retrieved and mapped to the position of the element buffer.

Figure 5:
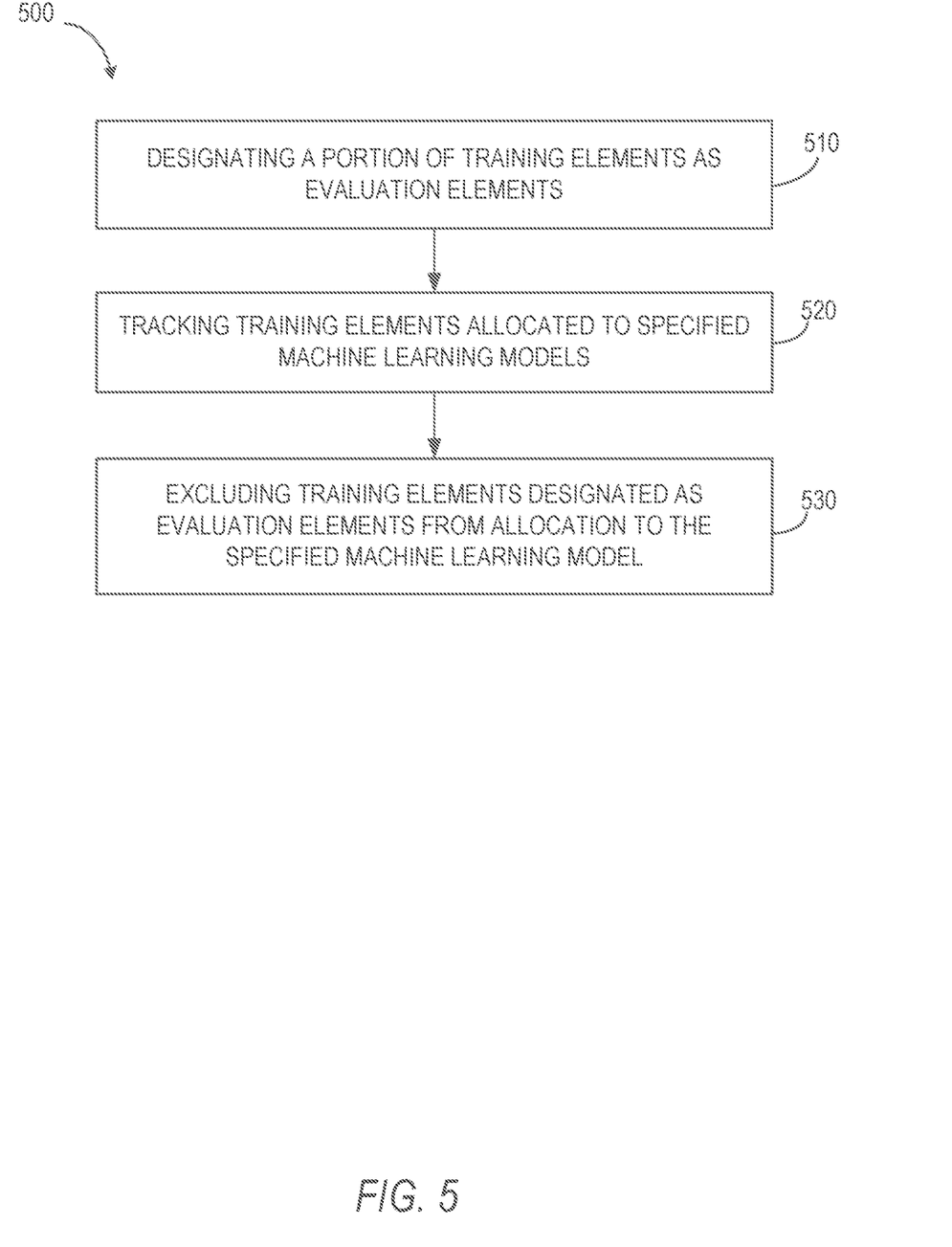
FIG. 5 is a flow diagram illustrating a method of sequentially sampling a multiset for machine learned model generation, according to some embodiments of the present disclosure.

FIG. 5 is a flow diagram illustrating an example method 500 of sequentially sampling a multiset for machine learned model generation, consistent with various embodiments described herein. The method 500 may be performed, at least in part, by, for example, the sampling system 22 illustrated in FIG. 2 (or an apparatus having similar components, such as one or more client devices 8 or application servers). In some embodiments, the method 500 is performed as a sub-operation or other part of the methods 300 or 400. As shown in FIG. 5, the method is performed as one or more sub-operations of method 300 in operations 310 and 360.

In operation 510, the assignment component 240 designates a portion of training elements of the plurality of training elements as evaluation elements. The evaluation elements may be designated for a specified machine learning model. In some embodiments, each machine learning model of the plurality of machine learning models may be designated a distinct portion of training elements as the evaluation elements for that machine learning model. In such embodiments, each machine earning model is provided with a distinct portion of training elements and a distinct portion of evaluation elements.

In operation 520, the distribution component 260 tracks training elements allocated to the specified machine learning model. In some embodiments, the distribution component 260 tracks the training elements in a manner similar to or the same as described above with respect to operation 420. In some instances, where the plurality of training elements are divided into subsets, including training subsets and evaluation subsets, the distribution component 260 may track elements according to a subset designation (e.g., training or evaluation).

In operation 530, the distribution component 260 excludes training elements designated as evaluation elements from allocation to the specified machine learning model. The distribution component 260 may exclude evaluation elements in a manner similar to or the same as described above in operation 430. In some embodiments, the distribution component 260 or the value component 230 identifies a random value generated in operation 330 as belonging to a subset of elements which has been designated as an evaluation subset for a specified machine learning model. In such instances, the distribution component 260 or the value component 230 may discard the random value and the value component 230 may generate a new random value. Random values may be generated for a buffer or position providing elements to the specified machine learning model until a value corresponding to a training subset is generated or selected. Upon generating the random value falling in a range associated with a training subset, the value component 230 may apply the value to the position within the buffer element and proceed to map a training element to the position, as described above.

Figure 6:
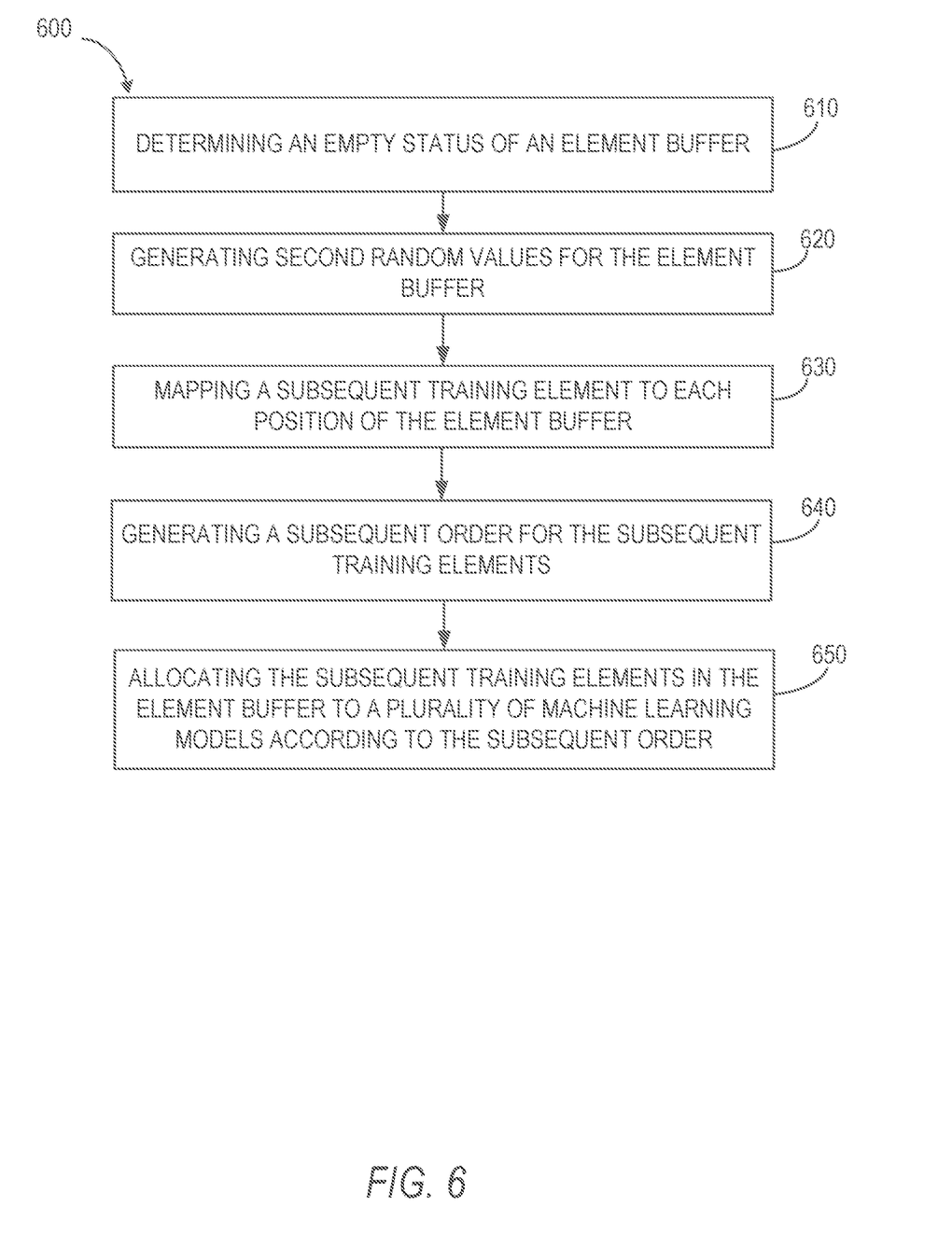
FIG. 6 is a flow diagram illustrating a method of sequentially sampling a multiset for machine learned model generation, according to some embodiments of the present disclosure.

FIG. 6 is a flow diagram illustrating an example method 600 of sequentially sampling a multiset for machine learned model generation, consistent with various embodiments described herein. The method 600 may be performed, at least in part, by, for example, the sampling system 22 illustrated in FIG. 2 (or an apparatus having similar components, such as one or more client devices 8 or application servers). In some embodiments, the method 600 is performed as a sub-operation or other part of the methods 300, 400, or 500. For example, the method 600 may be performed as one or more sub-operations of method 300 after operation 360.

In operation 610, the distribution component 260 determines an empty status of the element buffer. The empty status may represent allocation of the training elements in each position of the element buffer. The empty status may be determined based on a remaining number of positions of the element buffer containing a training element. In some instances, the empty status is determined by identifying a value for the position from which the most recent training element allocation was made. Although described with respect to specific examples, it should be understood that the distribution component 260 may determine the empty status in any suitable manner, such as by decrementing a buffer count upon each successful allocation.

In operation 620, the value component 230 generates second random values for the element buffer. The random values generated for the element buffer positions in operation 330 may be understood as first random values and subsequently generated random values as second random values, in some embodiments, the second random values may be generated in response to allocating each training element within the element buffer. Each second random value may be assigned to a distinct position of the element buffer.

In operation 630, the assignment component 240 maps a subsequent training element of the plurality of training elements to each position within the element buffer. In some embodiments, the subsequent training elements are mapped to positions of the element buffer based on the second random values. The subsequent training element may be mapped to each position in a manner similar to or the same as described above with respect to operation 340, described above with respect to FIG. 3.

In operation 640, the order component 250 generates a subsequent, order for the subsequent training elements. The subsequent order may be a random order, a pseudo random order, or an order modifying the second order described above. In some instances, the subsequent order may be the same as the second order. The subsequent order may be generated in a manner similar to or the same as described above with respect to operation 350.

In operation 650, the distribution component 260 allocates the subsequent training elements in the element buffer to the plurality of machine learning models according to the subsequent order. Allocation of the subsequent training elements may be sequentially performed from the positions of the element buffer. Allocation may be performed in a manner similar to or the same as described above with respect to operation 360.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented components or objects that operate to perform one or more operations or functions. The components and objects referred to herein may. In some example embodiments, comprise processor-implemented components and/or objects.

Similarly, the methods described herein may be at least partially processor-implemented. For example, at least some of the operations of a method may be performed by one or more processors or processor-implemented components. The performance of certain operations may be allocated among the one or more processors, not only residing within a single machine or computer, but deployed across a number of machines or computers. In some example embodiments, the processor or processors may be located in a single location (e.g., within a home environment, an office environment, or a server farm), while in other embodiments the processors may be allocated across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., APIs).

Figure 7:
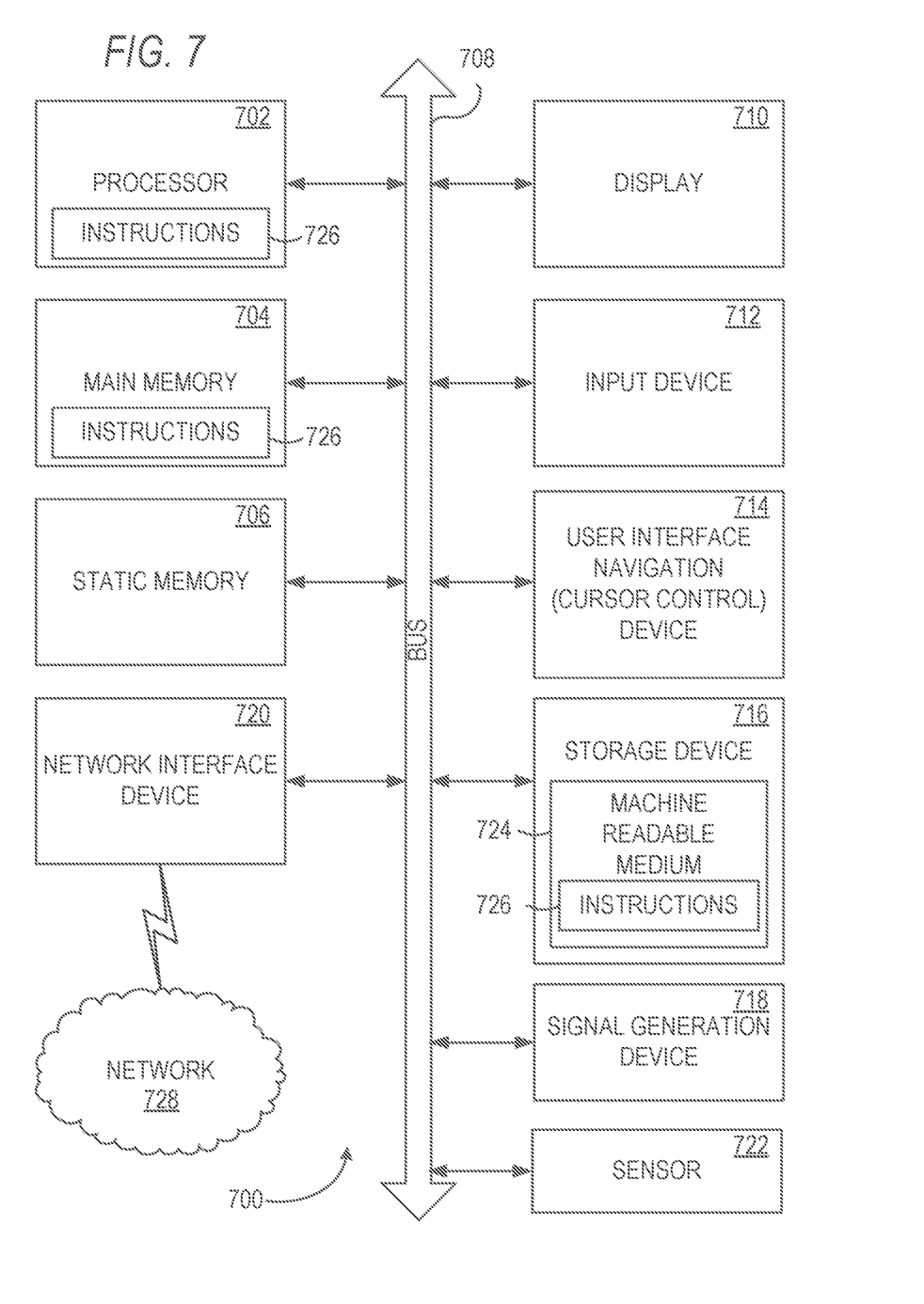
FIG. 7 is a block diagram of a machine in the form of a computing device within which a set of instructions, for causing the machine to perform any one or more of the methodologies discussed herein, may be executed.

FIG. 7 is a block diagram of a machine in the form of a computer system 700 within which a set of instructions, for causing the machine to perform any one or more of the methodologies discussed herein, may be executed. For example, the computer system 700 may be a server functioning as the sampling system 22. In some instances, the computer system 700 may be a set of similar computing devices storing instructions capable of configuring a processor of the computer system 700 as one or more of the components (hardware-software implemented components) described above. The configuration of a component, even for a period of time, causes the computer system 700 to act as a special-purpose computing device for performing one or more operations associated with the component, as described in the present disclosure. In some embodiments, the computer system 700 may function as the social networking system 10 with portions (e.g., hardware and instructions) partitioned to function as one or more of the components, interfaces, or systems described above during specified operations associated with those aspects of the components, interfaces, and systems.

In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In various embodiments, the machine may be a server computer; however, in alternative embodiments, the machine may be a personal computer (PC), a tablet PC, a set-top box (STB), a personal digital assistant (PDA), a mobile telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processor 702 (e.g., a central processing unit (CPU), a graphics processing unit (GPU), or both), a main memory 704, and a static memory 706, which communicate with each other via a bus 708. The computer system 700 may further include a display unit 710, an alphanumeric input device 712 (e.g., a keyboard), and a user interface navigation device 714 (e.g., a mouse). In one embodiment, the display unit 710, alphanumeric input device 712, and UI navigation device 714 are a touch screen display. The computer system 700 may additionally include a storage device 716 (e.g., drive unit), a signal generation device 718 (e.g., a speaker), a network interface device 720, and one or more sensors 722, such as a global positioning system sensor, compass, accelerometer, or other sensor.

The storage device 716 includes a machine-readable medium 724 on which is stored one or more sets of instructions 726 and data structures embodying or utilized by any one or more of the methodologies or functions described herein. The instructions 726 (e.g., processor-executable instructions) may also reside, completely or at least partially, within the main memory 704 (e.g., non-transitory machine-readable storage medium or processor-readable storage device) and/or within the processor 702 during execution thereof by the computer system 700, with the main memory 704 and the processor 702 also constituting machine-readable media 724.

While the machine-readable medium 724 is illustrated in an example embodiment to be a single medium, the term "machine-readable medium" may include a single medium or multiple media (e.g., a centralized or distributed database, and/or associated caches and servers) that store the one or more instructions 726. The term "machine-readable medium" shall also be taken to include any tangible medium that is capable of storing, encoding, or carrying the instructions 726 for execution by the machine and that cause the machine to perform any one or more of the methodologies of the present disclosure, or that is capable of storing, encoding, or carrying data structures utilized by or associated with such instructions 726. The term "machine-readable medium" shall accordingly be taken to include, but not be limited to, solid-state memories, and optical and magnetic media. Specific examples of machine-readable media 724 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks, magneto-optical disks; and compact disk read only memory (CD-ROM) and digital video disk read only memory (DVD-ROM) disks.

The instructions 726 may further be transmitted or received over a communication network 728 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi® and WiMax® networks). The term "transmission medium" shall be taken to include any intangible medium that is capable of storing, encoding, or carrying the instructions 726 for execution by the machine, and includes digital or analog communications signals or other intangible media to facilitate communication of such software.

Although embodiments have been described with reference to specific examples, it will be evident that various modifications and changes may be made to these embodiments without departing from the broader scope of the inventive concepts of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled, in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:

accessing a plurality of training elements;

generating an element buffer including a specified number of positions;

generating a random value for each position of the element buffer;

based on the random value for each position, mapping a training element of the plurality of training elements to each position within the element buffer, the training elements mapped to positions of the element buffer in a first order;

generating a second order for the training elements by modifying positions of the training elements in the element buffer; and allocating the training elements in the element buffer to a plurality of machine learning models according to the second order for generation of models related to natural language processing.

2. The method of claim 1, further comprising:
separating the plurality of training elements into two or more sets of training elements;
assigning a value range to each set of training elements of the two or more sets of training elements; and
mapping a certain training element of a set of training elements to each position within the element buffer based on the value range of the set of training elements associated with the certain training element and the random value of the positions.

3. The method of claim 2, further comprising:
mapping a first training element from a first set of training elements to a first position of the element buffer;
identifying a second training element to be mapped to a second position of the element buffer, the second training element associated with a second set of training elements; and
decrementing the first set of training elements in response to mapping the second training element to the second position of the element buffer.

4. The method of claim 2, further comprising:
designating a set of training elements of the two or more sets of training elements as an evaluation set, the evaluation set designated for a specified machine learning model;
tracking training elements allocated to the specified machine learning model; and
excluding training elements associated with the evaluation set from allocation to the specified machine learning model.

5. The method of claim 1, further comprising:
identifying a training element threshold for the plurality of machine learning models;
tracking a number of training elements allocated to each machine learning model of the plurality of machine learning models; and
based on a number of allocated training elements for a machine learning model exceeding the training element threshold, terminating allocation of training elements to the machine learning model.

6. The method of claim 5, further comprising:
designating a portion of training elements of the plurality of training elements as evaluation elements, the evaluation elements designated for a specified machine learning model;
tracking training elements allocated to the specified machine learning model; and
excluding training elements designated as evaluation elements from allocation to the specified machine learning model.

7. The method of claim 1, wherein the random value is selected from a set of values and the second order is a random order.

8. The method of claim 1, wherein the random values for the positions of the element buffer are first random values, the method further comprising:
determining an empty status of the element buffer, the empty status representing allocation of the training elements in each position of the element buffer;
in response to allocating each training element within the element buffer, generating second random values for the element buffer, each second random value being assigned to a distinct position of the element buffer;
mapping a subsequent training element of the plurality of training elements to each position within the element buffer, the subsequent training elements mapped to positions of the element buffer based on the second random values;
generating a subsequent order for the subsequent training elements; and
allocating the subsequent training elements in the element buffer to the plurality of machine learning models according to the subsequent order.

9. A system comprising:
one or more processors; and
a processor-readable storage device comprising processor executable instructions that, when executed by one or more processors of a machine, cause the machine to perform operations comprising:
  accessing a plurality of training elements;
  generating an element buffer including a specified number of positions;
  generating a random value for each position for the element buffer;
  based on the random value for each position, mapping a training element of the plurality of training elements to each position within the element buffer, the training elements mapped to positions of the element buffer in a first order;
  generating a second order for the training elements by modifying positions of the training elements in the element buffer; and
  allocating the training elements in the element buffer to a plurality of machine learning models according to the second order for generation of models related to natural language processing.

10. The system of claim 9, wherein the operations further comprise:
separating the plurality of training elements into two or more sets of training elements;
assigning a value range to each set of training elements of the two or more sets of training elements; and
mapping a certain training element of a set of training elements to a position within the element buffer based on the value range of the set of training elements associated with the certain training element and the random value of the positions.

11. The system of claim 10, wherein the operations further comprise:
mapping a first training element from a first set of training elements to a first position of the element buffer;
identifying a second training element to be mapped to a second position of the element buffer, the second training element associated with a second set of training elements; and
decrementing the first set of training elements in response to mapping the second training element to the second position of the element buffer.

12. The system of claim 10, wherein the operations further comprise:
designating a set of training elements of the two or more sets of training elements as an evaluation set, the evaluation set designated for a specified machine learning model;
tracking training elements allocated to the specified machine learning model; and
excluding training elements associated with the evaluation set from allocation to the specified machine learning model.

13. The system of claim 9, wherein the operations further comprise:
- identifying a training element threshold for the plurality of machine learning models;
- tracking a number of training elements allocated to each machine learning model of the plurality of machine learning models; and
- based on a number of allocated training elements for a machine learning model exceeding the training element threshold, terminating allocation of training elements to the machine learning model.

14. The system of claim 9, wherein the random values for the positions of the element buffer are first random values, the operations further comprising:
- determining an empty status of the element buffer, the empty status representing allocation of the training elements in each position of the element buffer;
- in response to allocating each training element within the element buffer, generating second random values for the element buffer, each second random value being assigned to a distinct position of the element buffer;
- mapping a subsequent training element of the plurality of training elements to each position within the element buffer, the subsequent training elements mapped to positions of the element buffer based on the second random values;
- generating a subsequent order for the subsequent training elements; and
- allocating the subsequent training elements in the element buffer to the plurality of machine learning models according to the subsequent order.

15. A processor-readable storage device comprising processor executable instructions that, when executed by one or more processors of a machine, cause the machine to perform operations comprising:
- accessing a plurality of training elements;
- generating an element buffer including a specified number of positions;
- generating a random value for each position of the element buffer;
- based on the random value for each position, mapping a training element of the plurality of training elements to each position within the element buffer, the training elements mapped to positions of the element buffer in a first order;
- generating a second order for the training elements by modifying positions of the training elements in the element buffer; and
- allocating the training elements in the element buffer to a plurality of machine learning models according to the second order for generation of models related to natural language processing.

16. The processor-readable storage device of claim 15, wherein the operations further comprise:
- separating the plurality of training elements into two or more sets of training elements;
- assigning a value range to each set of training elements of the two or more sets of training elements; and
- mapping a certain training element of the set of training elements to each position within the element buffer based on the value range of the set of training elements associated with the certain training element and the random value of the positions.

17. The processor-readable storage device of claim 16, wherein the operations further comprise:
- mapping a first training element from a first set of training elements to a first position of the element buffer;
- identifying a second training element to be mapped to a second position of the element buffer, the second training element associated with a second set of training elements; and
- decrementing the first set of training elements in response to mapping the second training element to the second position of the element buffer.

18. The processor-readable storage device of claim 16, wherein the operations further comprise:
- designating a set of training elements of the two or more sets of training elements as an evaluation set, the evaluation set designated for a specified machine learning model;
- tracking training elements allocated to the specified machine learning model; and
- excluding training elements associated with the evaluation set from allocation to the specified machine learning model.

19. The processor-readable storage device of claim 15, wherein the operations further comprise:
- identifying a training element threshold for the plurality of machine learning models;
- tracking a number of training elements allocated to each machine learning model of the plurality of machine learning models; and
- based on a number of allocated training elements for a machine learning model exceeding the training element threshold, terminating allocation of training elements to the machine learning model.

20. The processor-readable storage device of claim 15, wherein the random values for the position of the element buffer are first random values, the operations further comprising:
- determining an empty status of the element buffer, the empty status representing allocation of the training elements in each position of the element buffer;
- in response to allocating each training element within the element buffer, generating second random values for the element buffer, each second random value being assigned to a distinct position of the element buffer;
- mapping a subsequent training element of the plurality of training elements to each position within the element buffer, the subsequent training elements mapped to positions of the element buffer based on the second random values;
- generating a subsequent order for the subsequent training elements; and
- allocating the subsequent training elements in the element buffer to the plurality of machine learning models according to the subsequent order.

* * * * *